(12) United States Patent  (10) Patent No.: US 6,604,356 B1
Mills et al.  (45) Date of Patent: Aug. 12, 2003

(54) EMISSION CONTROL SYSTEM FOR GENERATOR ENGINE

(75) Inventors: Michael Mills, Matthews, NC (US); David James, Matthews, NC (US)

(73) Assignee: Envirolift, LLC, Charlotte, NC (US)

( * ) Notice: Subject to any disclaimer, the term of this patent is extended or adjusted under 35 U.S.C. 154(b) by 0 days.

(21) Appl. No.: 10/126,561

(22) Filed: Apr. 19, 2002

(51) Int. Cl.[7] .................................................. F01N 3/00
(52) U.S. Cl. ............................. 60/275; 60/274; 60/298; 60/320; 60/300; 422/186.04; 422/186.2; 422/186.21; 422/186.22; 422/186.19
(58) Field of Search ........................ 60/275, 274, 298, 60/300, 303, 320; 422/186.03, 186.04, 186.15, 186.18, 186.2, 186.21, 186.22, 186.19

(56) References Cited

U.S. PATENT DOCUMENTS

| | | |
|---|---|---|
| 3,228,755 A | 1/1966 | Lottinville |
| 3,263,412 A | 8/1966 | Thompson |
| 3,846,637 A | 11/1974 | Gettinger |
| 4,183,212 A | 1/1980 | Takagi |
| 4,199,938 A | 4/1980 | Nakase et al. |
| 4,484,444 A | 11/1984 | Bidwell |
| 4,488,400 A | 12/1984 | Eddy |
| 4,503,671 A | 3/1985 | Smith |
| 5,167,934 A | 12/1992 | Wolf et al. |
| 5,366,701 A * | 11/1994 | Taylor et al. .......... 422/186.04 |
| 5,410,871 A | 5/1995 | Masters et al. |
| 5,419,123 A | 5/1995 | Masters |
| 5,425,232 A | 6/1995 | Holtermann |
| 5,444,975 A | 8/1995 | Göhre et al. |
| 5,809,773 A | 9/1998 | Gottberg |
| 5,855,855 A * | 1/1999 | Williamson et al. ... 422/186.04 |
| 5,953,909 A * | 9/1999 | Wlatrip, III .................. 60/275 |
| 6,027,616 A | 2/2000 | Babko-Malyi |
| 6,058,698 A * | 5/2000 | Coral et al. ................... 60/275 |
| RE36,888 E | 10/2000 | Sougawa et al. |
| 6,253,544 B1 | 7/2001 | Miller et al. |
| 6,330,794 B1 | 12/2001 | Caren et al. |

* cited by examiner

*Primary Examiner*—Thomas Denion
*Assistant Examiner*—Binh Tran
(74) *Attorney, Agent, or Firm*—Adams Evans P.A.

(57) ABSTRACT

A system for reducing pollutants in internal combustion engine emissions, particularly marine electric generator engines, includes a treatment chamber having an intake opening for receiving gaseous emissions from the engine, and an exhaust opening for exiting emissions. A perforated metal tube is disposed within the treatment chamber, and an electrode is disposed within the metal tube in spaced apart relation to the metal tube. The electrode is encircled by the metal tube so that, upon applying a voltage at a predetermined frequency to the electrode, an arc is generated across the space between the electrode and the metal tube to promote a chemical reaction reducing the concentration of pollutants. The treatment chamber is contained within a manifold, and cooled by a flow of water. A supplemental air source is connected to the treatment chamber, and a chemical substrate is disposed within the treatment chamber for promoting the chemical reaction.

32 Claims, 8 Drawing Sheets

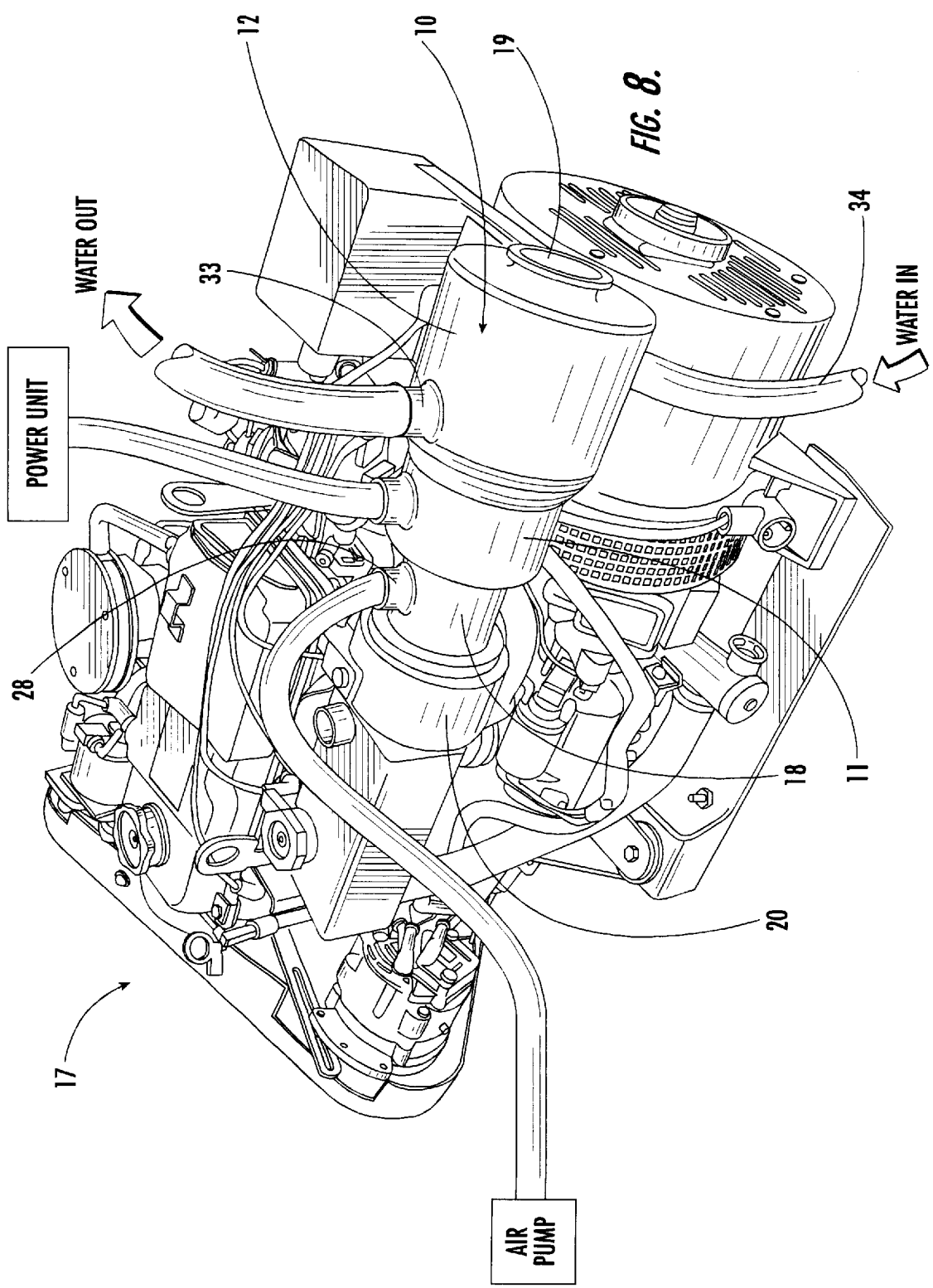

EMISSION CONTROL SYSTEM FOR GENERATOR ENGINE

TECHNICAL FIELD AND BACKGROUND OF THE INVENTION

The invention relates to an apparatus for reducing the concentration of pollutants in the exhaust emissions of an internal combustion engine, particularly an engine driving an electric generator on a boat. The invention is particularly adapted for connecting to the exhaust manifold of a marine electric generator engine.

It is well known that internal combustion engines produce an exhaust emission containing pollutants that are harmful to the environment. Such pollutants include carbon monoxide, carbon dioxide and various hydrocarbons. There are many inventions for reducing the concentration of such pollutants in engine exhaust emissions. For example, U.S. Pat. Nos. 5,410,871 and 5,419,123 each disclose emission control devices particularly suited for reducing pollutant levels in automobile exhaust emissions.

Pollution control for marine electric generator engines presents a unique set of challenges that have not been sufficiently addressed by the prior art. Houseboats and large cruisers typically have an electric generator for powering air conditioning, stereos, appliances and the like. Electricity is generated by a conventional internal combustion engine that produces an exhaust emission containing a relatively high concentration of pollutants. Typically, the concentration of pollutants is higher than that given off by automobile engines due to the lack of required anti-pollution equipment.

Such marine generators are commonly operated when the boat is stationary, and thus the pollutants are emptied into a single concentrated area in the water that is to where people may be swimming. The collection of toxic pollutants such as carbon monoxide near swimmers, particularly children, presents a potentially life-threatening situation making effective pollution control of marine generator engines critical. Emission control devices, such as the ones disclosed in U.S. Pat. Nos. 5,410,871 and 5,419,123 can get extremely hot during operation-over 300° Fahrenheit which can lead to overheating and fire. The danger of fire on a boat is just as life-threatening as the presence of poisonous gases, and therefore a pollution control device for a marine generator engine must be highly resistant to overheating as well as extremely effective in reducing poisonous gases. Furthermore, pollution control for a marine generator engine requires a device that is capable of eliminating the substantially higher concentrations of pollutants contained in the gaseous emissions of marine generator engines.

In an effort to overcome and eliminate the aforementioned problems, the present invention was conceived.

SUMMARY OF THE INVENTION

Therefore it is an object of the present invention to provide an apparatus and method for reducing the relatively high concentration of pollutants in the exhaust emissions of marine electric generator engines.

It is another object of the invention to provide an apparatus resistant to overheating that is capable of reducing the concentration of pollutants in the exhaust emissions of an internal combustion engine.

It is yet another object of the present invention to provide a pollution control apparatus that can be mated with a marine electric generator.

These and other objectives of the present invention are achieved by providing a system for reducing pollutants in internal combustion engine emissions having a treatment chamber including an intake opening and an exhaust opening at opposing lateral ends of the treatment chamber, the intake opening for receiving a stream of gaseous emissions from the engine, and the exhaust opening for exiting the gaseous emission stream from the chamber. A metal tube is disposed within the treatment chamber, and an electrode is disposed within the metal tube in spaced apart relation to the metal tube. The electrode is encircled by the metal tube so that, upon applying a voltage to the electrode, an arc is generated across the space between the electrode and the metal tube, the metal tube providing potential points of contact for the arc around the periphery thereof. The system further includes means for generating the arcing from the electrode to the metal tube at a predetermined frequency to promote a chemical reaction that reduces the concentration of pollutants in the stream within the treatment chamber, the arc generating means having a voltage source operatively connected to the electrode and a pulsing mechanism operatively configured with the voltage source to cause the voltage supplied to the electrode to be pulsed at the predetermined frequency.

According to one preferred embodiment of the invention, the metal tube is perforated to allow passage of the stream of gaseous emissions therethrough.

According to another preferred embodiment of the invention, the electrode is a threaded rod.

According to yet another preferred embodiment of the invention, the metal tube and electrode are disposed within the treatment chamber perpendicularly to the longitudinal axis of the treatment chamber. First and second baffles are disposed within the treatment chamber proximate the metal tube. The baffles are positioned on opposite sides of the metal tube at approximately forty-five degree angles relative to the metal tube whereby the baffles direct the stream of gaseous emissions toward the metal tube.

According to yet another preferred embodiment of the invention, the system includes a manifold having first and second openings at opposing lateral ends of the manifold, an inlet port for receiving a flow of water, and an outlet port for exiting the flow of water. At least a portion of the treatment chamber is contained within the manifold, and is positioned such that the intake opening is linearly aligned with the first opening and the exhaust opening is linearly aligned with the second opening. The treatment chamber and the manifold define a space wherein a flow of water cools the treatment chamber. The system further includes water supply means connected to the inlet port for introducing the flow of water into the manifold.

According to yet another preferred embodiment of the invention, the treatment chamber is longer than the manifold and includes a first segment having the intake opening and containing the metal tube proximate the intake opening. The first segment extends outward from the first opening of the manifold.

According to yet another preferred embodiment of the invention, the treatment chamber includes a second segment downstream from the first segment and having the exhaust opening. The second segment is contained within the manifold and cooled by the flow of water.

According to yet another preferred embodiment of the invention, the system includes a section of porous chemical substrate disposed within the second segment of the treatment chamber for promoting the chemical reaction.

According to yet another preferred embodiment of the invention, the system includes a plate covering a substantial portion of the exhaust opening to restrict passage of the stream of gaseous emissions therethrough.

According to yet another preferred embodiment of the invention, the pollutants include carbon monoxide, and the chemical substrate section includes an oxidizing agent for oxidizing carbon monoxide as it passes through the substrate.

According to yet another preferred embodiment of the invention, the chemical substrate section includes one or more of the group consisting of silica, sodium oxide, alumina, magnesia, calcium oxide, and iron oxide.

According to yet another preferred embodiment of the invention, the system is configured to be mateable with an exhaust system of a conventional marine electric generator engine.

According to yet another preferred embodiment of the invention, the water supply means is integral with the generator engine.

According to yet another preferred embodiment of the invention, the water supply means includes a radiator.

According to yet another preferred embodiment of the invention, the system includes a supplemental air source connected to the treatment chamber for supplying air for diluting the stream of gaseous emissions within the treatment chamber.

According to yet another preferred embodiment of the invention, the supplemental air source includes an air pump mounted in place of the generator engine's alternator. The air pump supplies air to the treatment chamber at a rate in the range of fifteen to twenty-three cubic feet per minute.

According to yet another preferred embodiment of the invention, the system includes a treatment chamber having intake and exhaust openings at opposing lateral ends of the treatment chamber, the intake opening for receiving a stream of gaseous emissions from an engine, and the exhaust opening for exiting the stream from the chamber. A supplemental air source is connected to the treatment chamber for supplying air for diluting the stream of gaseous emissions within the treatment chamber. A conductor having a predetermined high electric potential is disposed within the treatment chamber. An electrode is disposed in spaced apart relation to the conductor and has an opposite high electric potential so that, upon applying a voltage to the electrode, an arc is generated across the space between the electrode and the conductor. The system includes means for generating the arcing from the electrode to the metal tube at a predetermined frequency to promote a chemical reaction reducing the concentration of pollutants in the stream within the treatment chamber, the arc generating means including a voltage source operatively connected to the electrode and a pulsing mechanism operatively configured with the voltage source causing the voltage supplied to the electrode to be pulsed at the predetermined frequency.

According to yet another preferred embodiment of the invention, the conductor is a metal tube encircling the electrode so that, upon applying a voltage to the electrode, an arc is generated across the space between the electrode and the metal tube. The metal tube provides potential points of contact for the arc around the periphery thereof.

According to yet another preferred embodiment of the invention, the pollutants include one or more substances selected from the group consisting of carbon monoxide and hydrocarbons, and the chemical reaction comprises a conversion of a substantial portion of the pollutants to one or more substances selected from the group consisting of oxygen, water, hydrogen and carbon dioxide.

According to yet another preferred embodiment of the invention, the system is made of stainless steel.

According to yet another preferred embodiment of the invention, the system includes a section of porous chemical substrate disposed within the treatment chamber for promoting the chemical reaction.

According to yet another preferred embodiment of the invention, the chemical substrate section is disposed downstream from the metal tube so that the stream of gaseous emissions passing proximate the metal tube subsequently passes through the chemical substrate.

An embodiment of the method of reducing pollutants in the gaseous emissions of a marine electric generator according to the invention includes the steps of providing a treatment chamber having an intake and exhaust openings at opposing lateral ends of the chamber, a metal tube disposed within the treatment chamber containing an electrode disposed in spaced apart relation to the metal tube and having an opposite high electric potential so that, upon applying a voltage to the electrode, an arc is generated across the space between the electrode and the metal tube, and a porous chemical substrate disposed within the treatment chamber downstream from the metal tube. The intake opening is connected to the exhaust system of the marine electric generator engine so that a stream of gaseous emissions passes from the exhaust system through the intake opening into said treatment chamber. A supplemental stream of air is supplied to the treatment chamber to dilute the stream of gaseous emissions within the treatment chamber, and a voltage is pulsed at a predetermined frequency to the electrode to generate arcing from the electrode to the metal tube at the predetermined frequency to promote a chemical reaction with the stream of gaseous emissions as the stream passes proximate the metal tube. The chemical reaction reduces the concentration of pollutants in the gaseous emission stream.

Another embodiment of the method of reducing pollutants in the gaseous emissions of a marine electric generator according to the invention includes the steps of providing a device comprising a treatment chamber having an intake and exhaust openings at opposing lateral ends of the treatment chamber, a metal tube disposed within the treatment chamber containing an electrode disposed in spaced apart relation to the metal tube and having an opposite high electric potential so that, upon applying a voltage to the electrode, an arc is generated across the space between the electrode and the metal tube, a porous chemical substrate disposed within the treatment chamber downstream from the metal tube, and, a manifold having first and second openings at opposing lateral ends of the manifold, the manifold further including an inlet port for receiving a flow of water and an outlet port for exiting the flow of water. At least a portion of the treatment chamber is contained within the manifold, and the treatment chamber is positioned such that the intake opening is linearly aligned with the first opening and the exhaust opening is linearly aligned with said second opening. The treatment chamber and the manifold define a space wherein the flow of water cools the treatment chamber.

The intake opening is connected to the exhaust system of the marine electric generator engine so that a stream of gaseous emissions passes from the exhaust system through the intake opening into the treatment chamber. A supplemental stream of air is supplied to the treatment chamber to dilute the stream of gaseous emissions within the treatment chamber.

A voltage is pulsed at a predetermined frequency to the electrode to generate an arc from the electrode to the metal tube at the predetermined frequency to promote a chemical reaction with the stream of gaseous emissions as the stream passes proximate the metal tube. The chemical reaction reduces the concentration of pollutants in the stream. A water source is connected to the inlet port and supplies the flow of water into the manifold through the inlet port for cooling the treatment chamber.

Yet another embodiment of the method of reducing pollutants in the gaseous emissions of a marine electric generator according to the invention includes the step of providing a chemical substrate that promotes a chemical reaction with the stream of gaseous emissions further reducing the concentration of pollutants therein as the stream passes through the substrate.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 8 is an environmental view of the preferred emission control system shown in FIG. 1.

DESCRIPTION OF THE PREFERRED EMBODIMENT AND BEST MODE

Figure 1:
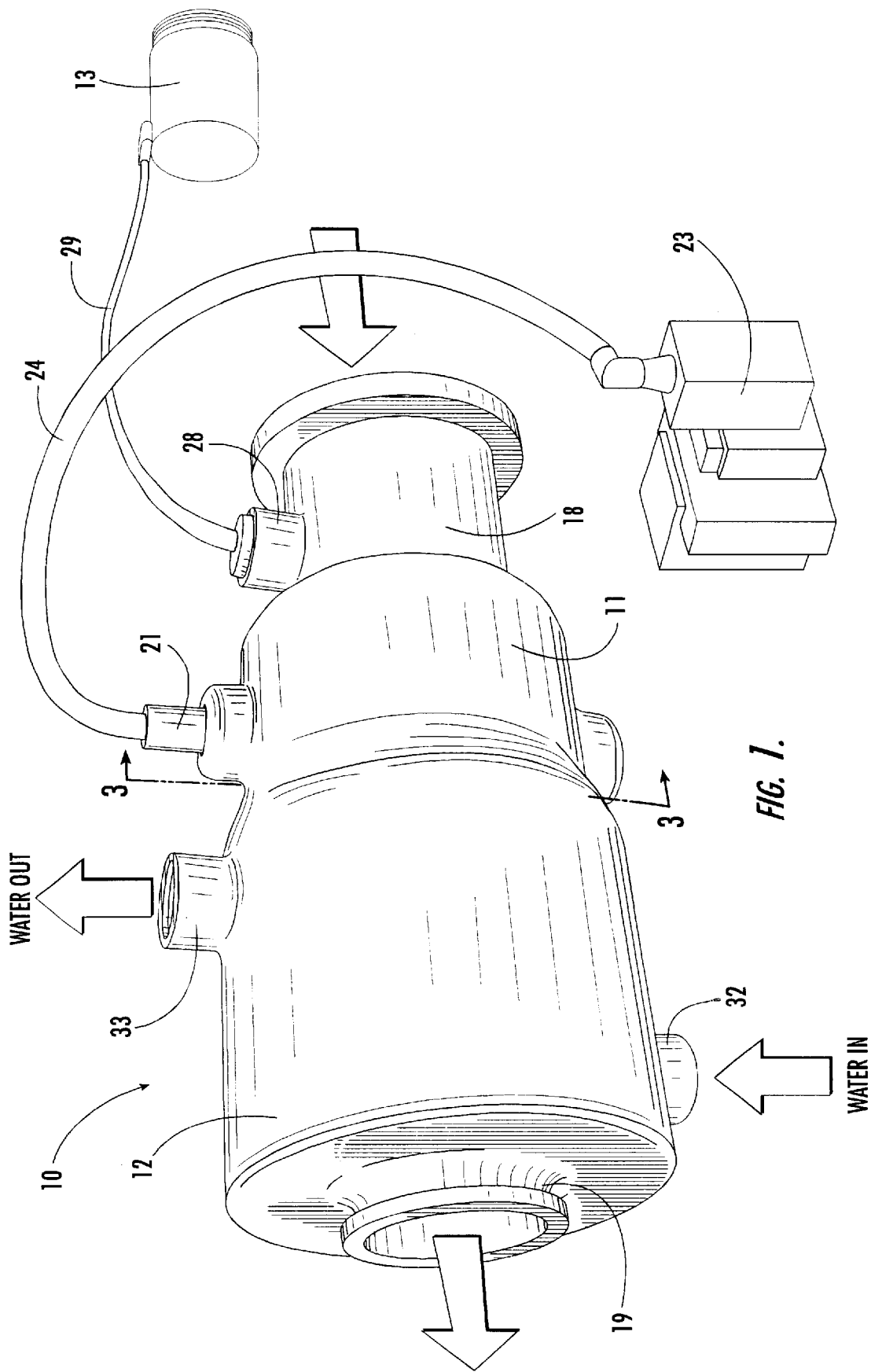
FIG. 1 is a perspective view of a preferred emission control system according to the invention.
Figure 2:
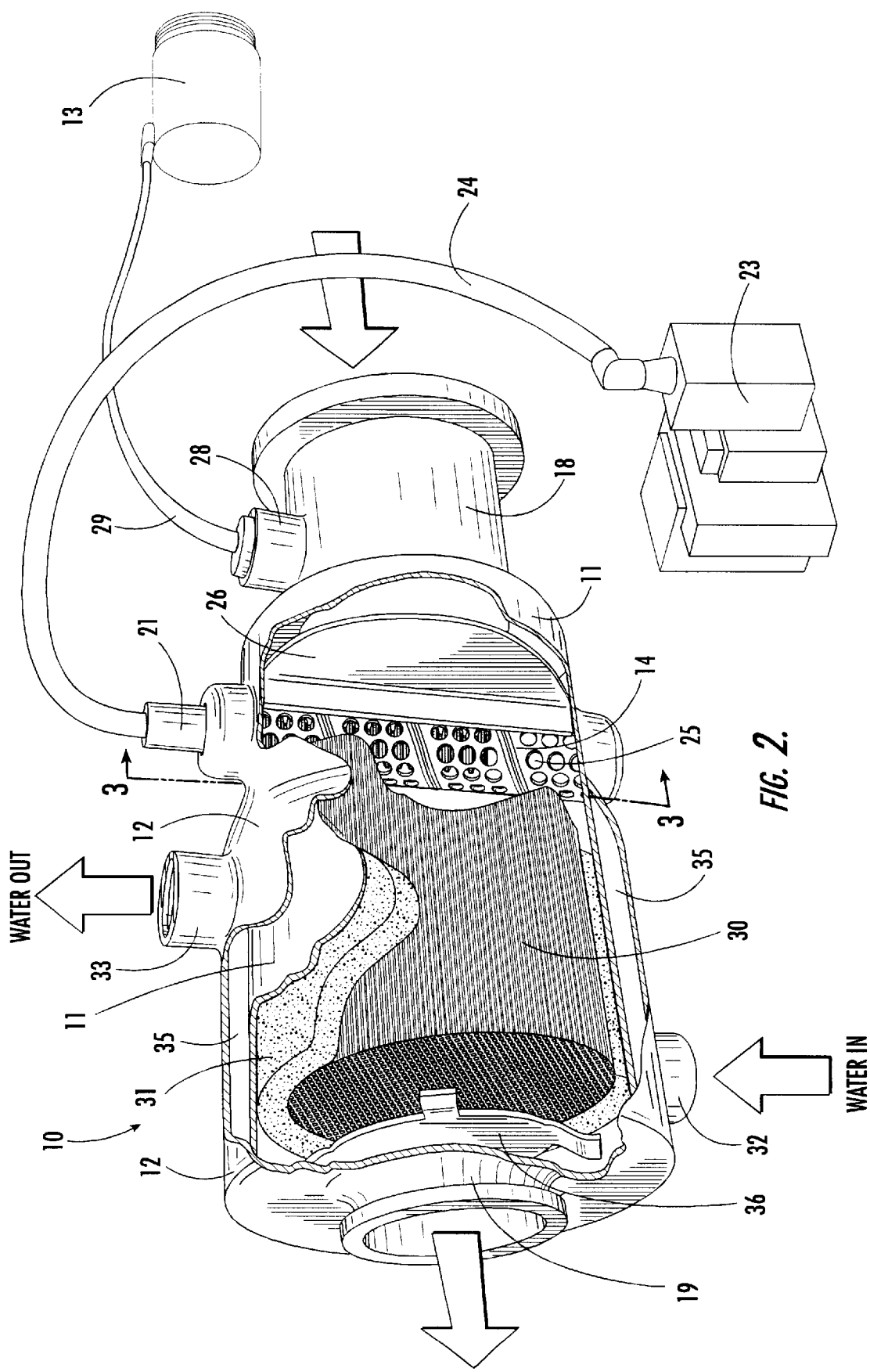
FIG. 2 is a partial cut-away view of the preferred emission control system shown in FIG. 1.

Referring now specifically to the drawings, a preferred embodiment of the emission control system according to the present invention is illustrated in FIG. 1, and shown generally at reference numeral 10. As can be seen in FIG. 2, the emission control system 10 comprises a treatment chamber 11 positioned within a manifold 12, and an air pump 13. A metal tube 14 containing an electrode 15, and a porous chemical substrate 16 are positioned within the treatment chamber 11 to promote a chemical reaction that reduces the concentration of pollutants in the gaseous emissions of a conventional marine electric generator engine 17, shown in FIG. 8.

As shown in FIG. 1, the treatment chamber 11 is a hollow cylinder, preferably made of 316 L stainless steel. The treatment chamber 11 includes an intake pipe 18 and an exhaust pipe 19 located at opposite lateral ends of the treatment chamber 11 that define openings through which a stream of gaseous emissions enters and exits the treatment chamber 11, respectively. The intake pipe 18 is attached to the exhaust manifold 21 of the marine generator engine 17, as shown in FIG. 8. The marine generator engine 17 generates electricity by an internal combustion that produces gaseous emissions containing a high concentration of environmental pollutants such as carbon monoxide and various hydrocarbons. The gaseous emission stream is expelled from the engine 17 through its exhaust manifold 20 and enters the emission control system 10 through the intake pipe 18. The gaseous emission stream flows through the treatment chamber 11 and exits through the exhaust pipe 19.

Figure 3:
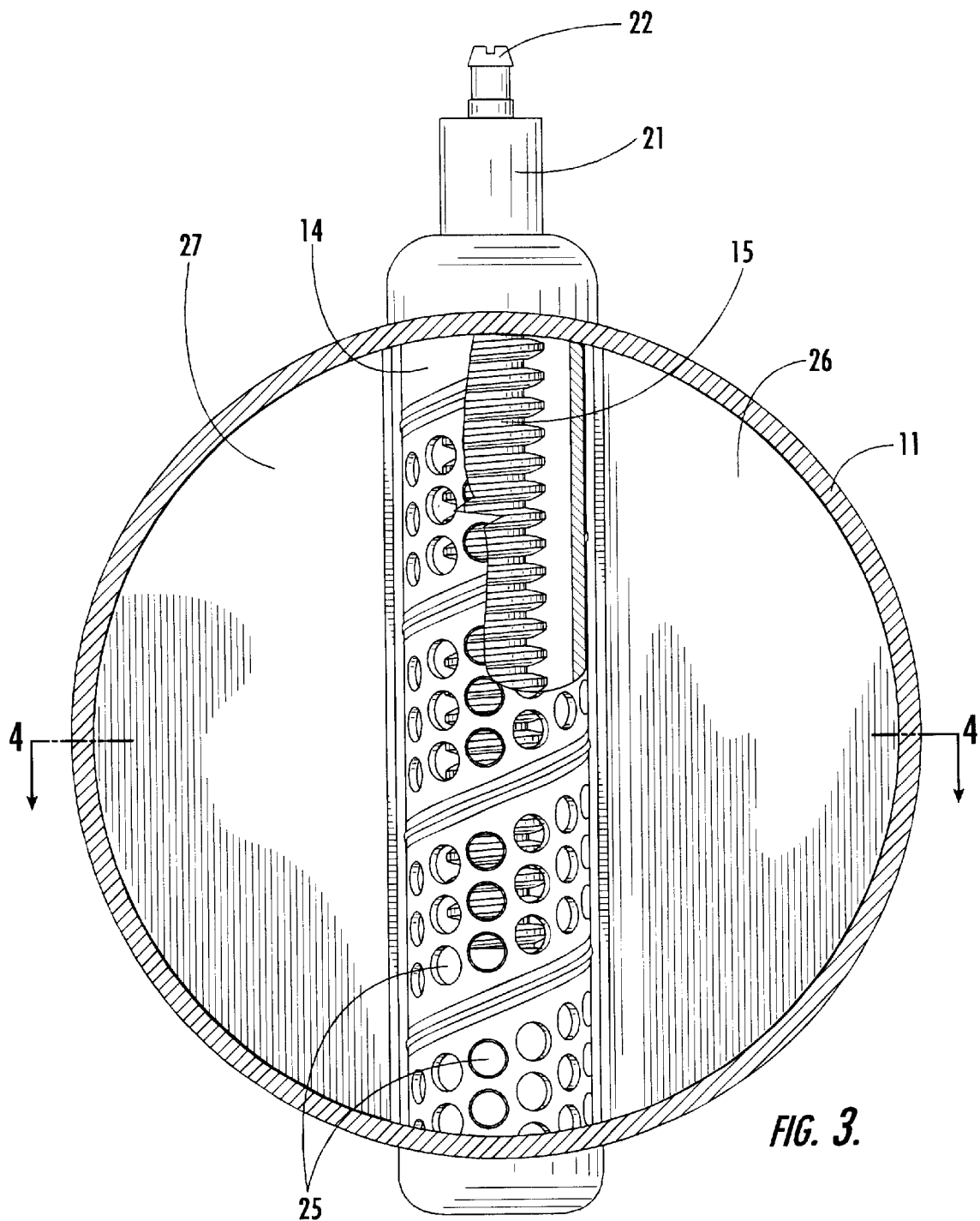
FIG. 3 is a cross sectional view of the preferred emission control system shown in FIG. 1 along lines 3—3.
Figure 4:
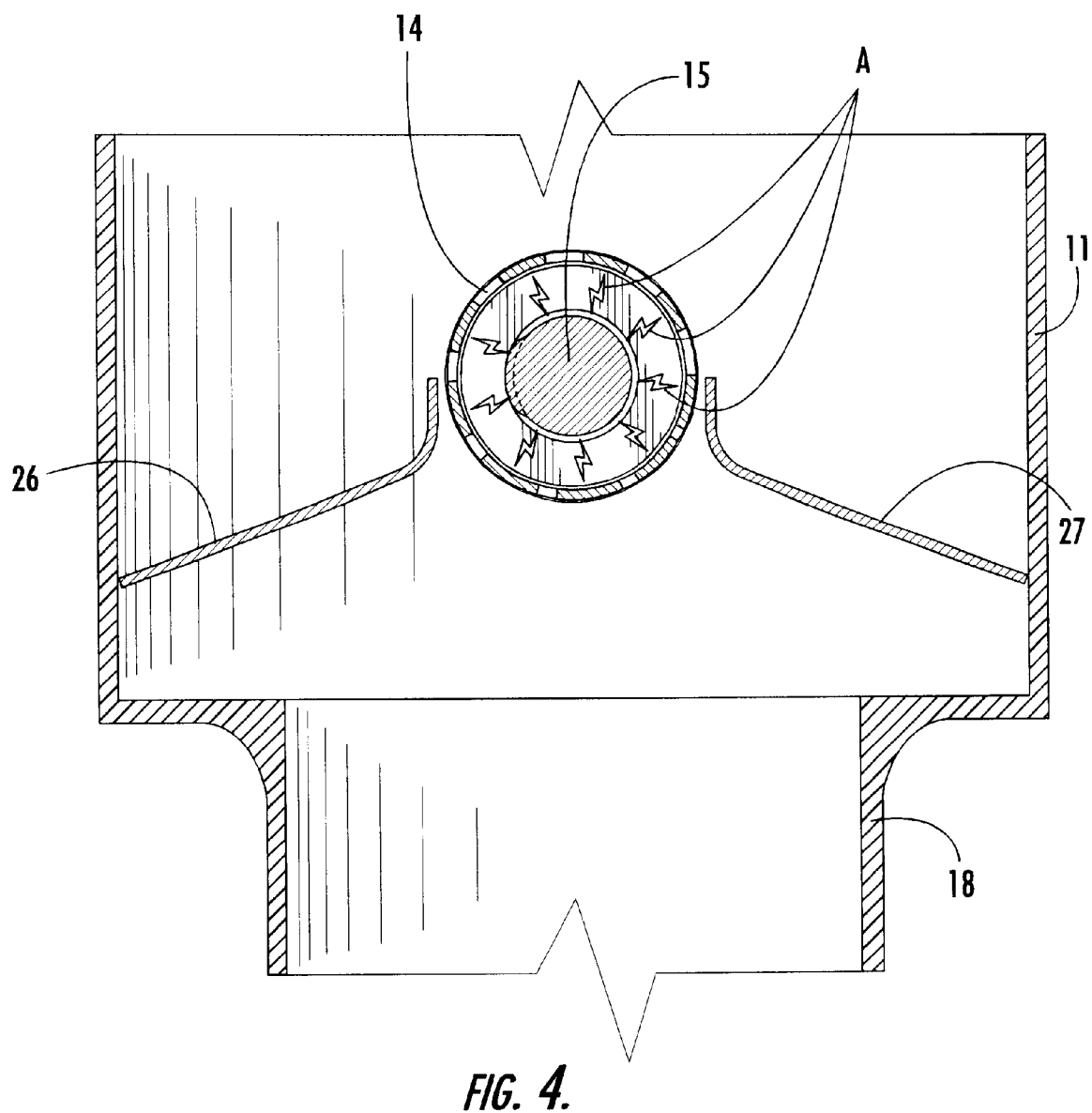
FIG. 4 is a partial cross sectional view of the preferred emission control system shown in FIG. 3 along lines 4—4.

As shown in FIGS. 2–5, a cylindrical metal tube 14 is disposed within the treatment chamber 11 downstream from the intake pipe 18. The metal tube 14 is positioned perpendicularly to the longitudinal axis of the treatment chamber 11. The metal tube 14 the electrode 15 are preferably made of 316 L stainless steel. As can best be seen in FIG. 3, the electrode 15 is an elongate threaded rod extending through the center of the metal tube 14, and is perpendicular to the longitudinal axis of the treatment chamber 11. A portion of the electrode 15 protrudes upward through an opening in the treatment chamber 11 and is disposed within a ceramic insulator 21. A threaded cap 22 is affixed on the top of the electrode, which extends above the ceramic insulator 21. The electrode 15 is operatively connected to a power unit 23 by a cord 24. The power unit 23 is connected to the electrical system of the marine generator engine 17 and supplies a voltage to the electrode 15 that generates electric arcing "A" across the space between the electrode 15 and metal tube 14, as shown in FIG. 4. Because the electrode 15 is encircled by the metal tube 14, there is arcing "A" in all directions from the electrode 15 to the metal tube 14 upon suppling the voltage to the electrode 15. The cord 24 is held on the electrode 15 by the cap 22. The electrode 15 is threaded to increase the surface area from which the electric arcing "A" is generated. The metal tube 14 is perforated throughout with a plurality of holes 25 to facilitate passage of the stream of gaseous emissions through the metal tube 14. The voltage supplied by the power unit 23 is pulsed at a frequency that has been predetermined to maximize the reduction of pollutants contained in the gaseous emission stream within the treatment chamber 11. The preferred voltage is 15,000 volts and the preferred frequency is 1500 pulses per minute. The power unit 23 is similar in design and function to the AC voltage source described in U.S. Pat. No. 5,410,871 for an "Emission Control Device and Method" (column 5, line 40 to column 6, line 59), which is incorporated herein, and therefore is not described in detail.

It is believed that the electric arcing "A" generated from the electrode 15 excites metal atoms on the surface of the metal tube 14 causing a metallic catalyst reaction between the metal atoms and the molecules of pollutants contained in the gaseous emission stream. This reaction reduces the concentration of pollutants in the gaseous emission stream. For instance, a substantial portion of carbon monoxide is broken down into free carbon and oxygen. For a further explanation of the reaction, applicant references U.S. Pat. No. 5,410,871 (column 7, lines 1–30), which is incorporated herein.

The holes 25 of the metal tube 14 and the threaded surface of the electrode 15 increase the efficiency of the reaction. In addition, two baffles 26, 27 are positioned perpendicularly to the longitudinal axis of the treatment chamber 11 on each side of the metal tube 14, as shown in FIGS. 3 and 4. The baffles 26, 27 are oriented at forty-five degree angles relative to the metal tube 14 and channel the stream of gaseous emissions directly to the metal tube 14 and electrode 15. This minimizes the amount of gaseous pollutants passing through the system without undergoing the voltage induced reaction and maximizes efficiency of the system.

As shown in FIGS. 1 and 2, the intake pipe 18 includes an air intake port 28 for connecting a tube 29 from an air pump 13, which is mounted on the generator engine 17 in place of the alternator. A trickle charge device can be used in place of the alternator on the generator engine 17. The air pump 13 is belt driven by the crank shaft of the generator engine 17. The air pump 13 supplies a supplemental air source to the treatment chamber 11 diluting the gaseous emission stream. The air pump 13 preferably supplies air at a rate of fifteen to twenty-three cubic feet per minute. It is believed that the additional oxygen provided by the supplemental air facilitates a more complete chemical breakdown of pollutants contained in the gaseous emission stream. In addition, the supplemental airflow increases the flow rate of the emission stream, which results in improved arcing from the electrode 15 to metal tube 14. As such, the air pump 13 improves the overall efficiency of the system 10.

Figure 5:
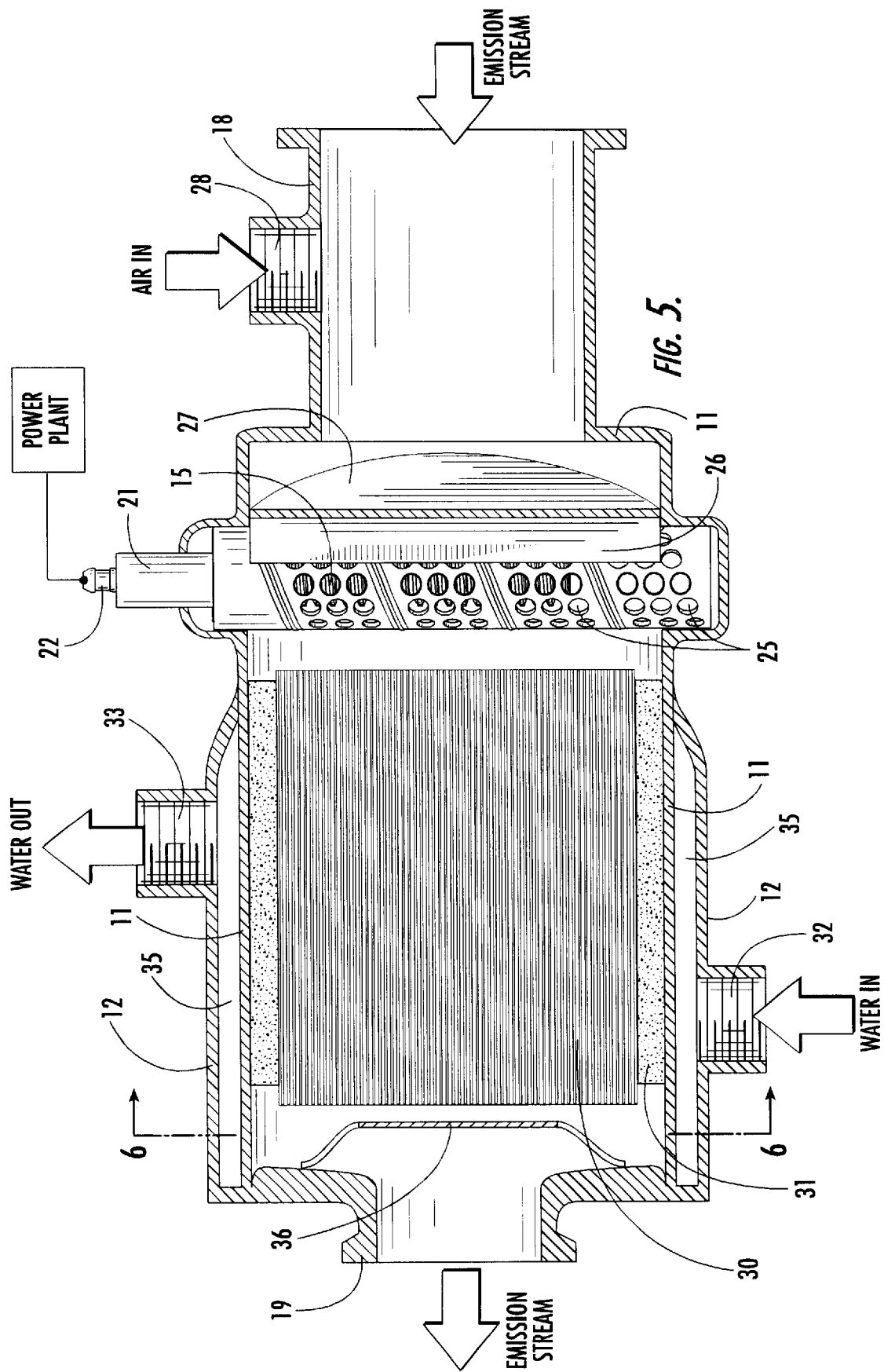
FIG. 5 is a cross sectional view of the preferred emission control system shown in FIG. 1.
Figure 6:
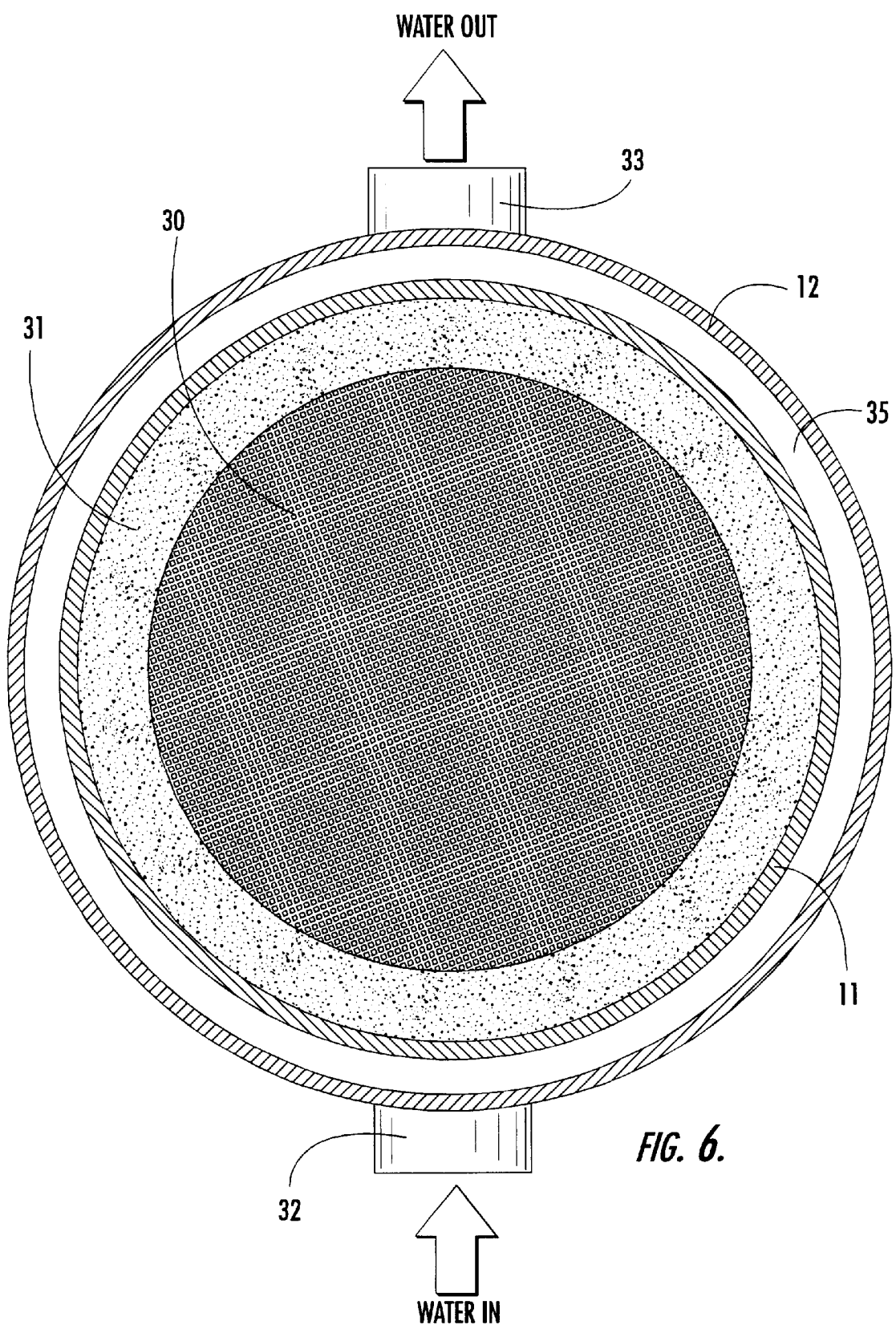
FIG. 6 is a cross sectional view of the preferred emission control system shown in FIG. 5 along lines 6—6.

As shown in FIGS. 2, 5, and 6, a porous chemical substrate 30 is positioned within the treatment chamber 11 downstream from the metal tube 14 and electrode 15. The preferred substrate 30 is a perforated honeycomb material comprised of silica (94.5% by weight), sodium oxide (2.15%), alumina (2.1%), magnesia (1.2%), calcium oxide (0.02%), and iron oxide (0.03%). The substrate 30 is porous so that the gaseous emission stream flows through the substrate 30. The substrate 30 is cylindrical with a diameter slightly smaller than the treatment chamber 11. Between the substrate 30 and the inner wall of the treatment chamber 11 is a layer of asbestos 31 that cushions the substrate 30 and protects it from abrasions. The gaseous emission stream, after having traveled through the metal tube 14 and undergone the initial voltage induced chemical reaction, subsequently travels through the substrate 30 where a complete chemical breakdown of pollutants contained within the gaseous emissions takes place. For instance, carbon monoxide flowing through the substrate 30 is oxidized to produce carbon dioxide. The substrate 30 significantly improves the performance and efficiency of the system 10. For a further explanation of the substrate 30 and the chemical reaction taking place within the substrate 30, applicant refers to U.S. Pat. No. 5,419,123, which is incorporated herein.

As can best be seen in FIG. 2, the manifold 12 is substantially similar in shape to the treatment chamber 11, however, the manifold 12 has a slightly shorter length and slightly larger diameter than the treatment chamber 11. The treatment chamber 11 is positioned within the manifold 12 such that the portion of the treatment chamber 11 containing the substrate 30 is contained within the manifold 12, while the portion containing the metal tube 14 and electrode 15 are not. The manifold 12 includes an inlet port 32 for receiving a flow of water and an outlet port 33 for exiting the flow of water, shown in FIGS. 2 and 5. The flow of water is supplied by a water pumping system integral with the generator engine 17 that is connected to the inlet port 32 by a tube 34, shown in FIG. 8. When used in freshwater, the water pumping system is an open system that supplies water to the manifold 12 directly from the freshwater source. When used in salt water, the water pumping system 39 is a closed system that supplies water from the radiator of the generator engine 17. The water flow is introduced into the manifold 12 through the inlet port 32 and flows within the space 35 between the treatment chamber 11 and the manifold 12 before exiting through the outlet port 33. The water flow cools the temperature of the treatment chamber 11, preferably to the range of from 300° to 150° Fahrenheit, which is the optimum range of temperature in which to operate the system 10.

Figure 7:
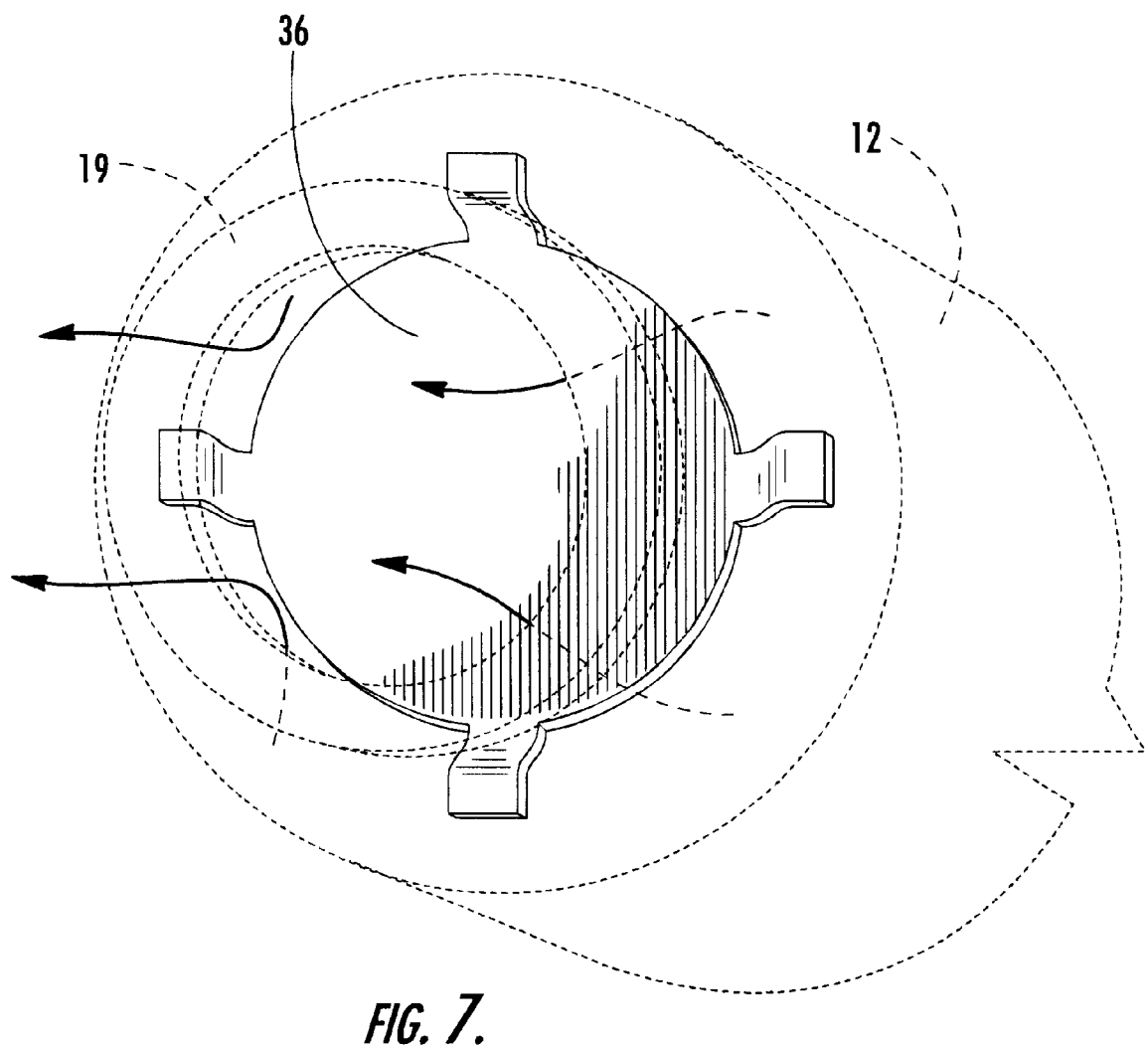
FIG. 7 is a partial phantom view of the preferred emission control system shown in FIG. 1.

As shown in FIGS. 2 and 5, the manifold 12 has an exit opening through which the exhaust pipe 19 of the treatment chamber 12 extends outward and into the atmosphere. After the gaseous emission stream has passed through the substrate 30 it flows toward the exhaust pipe 19. Positioned immediately in front of the exhaust pipe 19 is a retention plate 36. The retention plate 36 is connected to the inner surface of the treatment chamber 11 and covers a substantial portion, but not all, of the opening defined by the exhaust pipe 19, as shown in FIG. 7. This retards the flow of the gaseous emission stream proximate the substrate 30 to ensure a complete chemical reaction and breakdown of pollutants within the substrate 30. Finally, the gaseous emission stream exits the system 10 through exhaust pipe 19 and enters the atmosphere with a greatly reduced concentration of pollutants than when it initially entered the system 10. A substantial portion of the carbon monoxide and hydrocarbons in the gaseous emissions entering the system 10 are converted into carbon dioxide, oxygen, water vapor, and free carbon. Applicant has found that a typical carbon monoxide concentration of 50,000 parts per million in the gaseous emissions of a marine generator engine not using the system 10 is significantly reduced to twenty-five parts per million when operated in conjunction with the system 10.

An emission control system and a method for reducing pollutants in the gaseous emissions of a marine electric generator are disclosed above. Various embodiments of the invention can be made without departing from its scope. Furthermore, the foregoing description of the preferred embodiment of the invention and the best mode for practicing the invention are provided for the purpose of illustration only and not for the purpose of limitation—the invention being defined by the following claims.

We claim:

1. A system for reducing pollutants in internal combustion engine emissions, and comprising:
   (a) a treatment chamber having an intake opening and an exhaust opening at opposing lateral ends of said treatment chamber, said intake opening for receiving a stream of gaseous emissions from the engine, said exhaust opening for exiting the stream from said chamber;
   (b) a metal tube disposed within said treatment chamber;
   (c) an electrode disposed within said metal tube in spaced apart relation to said metal tube, said electrode encircled by said metal tube so that, upon applying a voltage to said electrode, an arc is generated across the space between said electrode and said metal tube, said metal tube providing potential points of contact for the arc around the periphery thereof; and
   (d) means for generating the arc from said electrode to said metal tube at a predetermined frequency to promote a chemical reaction reducing the concentration of pollutants in the stream within said treatment chamber, said arc generating means comprising a voltage source operatively connected to said electrode and a pulsing mechanism operatively configured with said voltage source to cause the voltage supplied to said electrode to be pulsed at the predetermined frequency.

2. A system for reducing pollutants in internal combustion engine emissions according to claim 1, wherein said metal tube is perforated to allow passage of the stream of gaseous emissions therethrough.

3. A system for reducing pollutants in internal combustion engine emissions according to claim 1, wherein said electrode comprises a threaded rod.

4. A system for reducing pollutants in internal combustion engine emissions according to claim 1, wherein said metal tube and said electrode are disposed within said treatment chamber perpendicularly to a longitudinal axis of said treatment chamber, and further comprising first and second baffles disposed within said treatment chamber proximate said metal tube, said first and second baffles positioned on opposite sides of said metal tube at approximately forty-five degree angles relative to said metal tube whereby said first and second baffles direct said stream of gaseous emissions toward said metal tube.

5. A system for reducing pollutants in internal combustion engine emissions according to claim 1, further comprising:
   (a) a manifold having first and second openings at opposing lateral ends of said manifold, said manifold further including an inlet port for receiving a flow of water and an outlet port for exiting the flow of water, at least a portion of said treatment chamber contained within said manifold, said treatment chamber positioned such that said intake opening is linearly aligned with said first opening and said exhaust opening is linearly aligned with said second opening, said treatment chamber and said manifold defining a space therebetween wherein the flow of water cools said treatment chamber; and
   (b) water supply means connected to said inlet port for introducing the flow of water into said manifold.

6. A system for reducing pollutants in internal combustion engine emissions according to claim 5, wherein said treatment chamber is longer than said manifold and comprises a first segment including said intake opening and containing said metal tube proximate said intake opening, said first segment extending outward from said first opening of said manifold.

7. A system for reducing pollutants in internal combustion engine emissions according to claim 6, wherein said treatment chamber comprises a second segment downstream from said first segment and including said exhaust opening, said second segment contained within said manifold and cooled by the flow of water.

8. A system for reducing pollutants in internal combustion engine emissions according to claim 7, further comprising a section of porous chemical substrate disposed within said second segment of said treatment chamber for promoting the chemical reaction.

9. A system for reducing pollutants in internal combustion engine emissions according to claim 8, further comprising a plate covering a substantial portion of said exhaust opening to restrict passage of the stream of gaseous emissions therethrough.

10. A system for reducing pollutants in internal combustion engine emissions according to claim 8, wherein the pollutants comprise carbon monoxide, and said chemical substrate section comprises an oxidizing agent for oxidizing carbon monoxide as it passes through said substrate.

11. A system for reducing pollutants in internal combustion engine emissions according to claim 8, wherein said chemical substrate section comprises one or more of the group consisting of silica, sodium oxide, alumina, magnesia, calcium oxide, and iron oxide.

12. A system for reducing pollutants in internal combustion engine emissions according to claim 5, wherein said system is configured to be mateable with an exhaust system of a conventional marine electric generator engine.

13. A system for reducing pollutants in internal combustion engine emissions according to claim 12, wherein said water supply means is integral with said generator engine.

14. A system for reducing pollutants in internal combustion engine emissions according to claim 12, wherein said water supply means comprises a radiator.

15. A system for reducing pollutants in internal combustion engine emissions according to claim 1, further comprising a supplemental air source connected to said treatment chamber for supplying air for diluting the stream of gaseous emissions within said treatment chamber.

16. A system for reducing pollutants in internal combustion engine emissions according to claim 15, wherein said supplemental air source comprises an air pump mounted in place of said generator engine's alternator, said air pump supplying air to said treatment chamber at a rate in the range of fifteen to twenty-three cubic feet per minute.

17. A system for reducing pollutants in internal combustion engine emissions, and comprising:
   (a) a treatment chamber having an intake opening and an exhaust opening at opposing lateral ends of said chamber, said intake opening for receiving a stream of gaseous emissions from an engine, said exhaust opening for exiting the stream from said chamber;
   (b) a supplemental air source connected to said treatment chamber for supplying air for diluting the stream of gaseous emissions within said treatment chamber;
   (c) a conductor having a predetermined high electric potential disposed within said treatment chamber;
   (d) an electrode disposed in spaced apart relation to said conductor and having an opposite high electric potential so that, upon applying a voltage to said electrode, an arc is generated across the space between said electrode and said conductor; and
   (e) means for generating said arc from said electrode to said metal tube at a predetermined frequency to promote a chemical reaction reducing the concentration of pollutants in said stream within said treatment chamber, said arc generating means comprising a voltage source operatively connected to said electrode and a pulsing mechanism operatively configured with said voltage source causing the voltage supplied to said electrode to be pulsed at the predetermined frequency.

18. A system for reducing pollutants in internal combustion engine emissions according to claim 17, wherein said conductor is a metal tube encircling said electrode so that, upon applying a voltage to said electrode, an arc is generated across the space between said electrode and said metal tube, said metal tube providing potential points of contact for the arc around the periphery thereof.

19. A system for reducing pollutants in internal combustion engine emissions according to claim 17, wherein said supplemental air source comprises an air pump connected to said treatment chamber proximate said intake opening, said air pump supplying air to said treatment chamber at a rate in the range of fifteen to twenty-three cubic feet per minute.

20. A system for reducing pollutants in internal combustion engine emissions according to claim 17, wherein said pollutants comprise one or more substances selected from the group consisting of carbon monoxide and hydrocarbons, and said chemical reaction comprises a conversion of a substantial portion of said pollutants to one or more substances selected from the group consisting of oxygen, water, hydrogen and carbon dioxide.

21. A system for reducing pollutants in internal combustion engine emissions according to claim 17, wherein said system is configured to be mateable with an exhaust system of a marine electric generator engine.

22. A system for reducing pollutants in internal combustion engine emissions according to claim 17, wherein said metal tube is perforated to allow the passage of said stream of gaseous emissions therethrough, and said electrode comprises a threaded rod.

23. A system for reducing pollutants in internal combustion engine emissions according to claim 17, wherein said system is made of stainless steel.

24. A system for reducing pollutants in internal combustion engine emissions according to claim 17, wherein said metal tube and said electrode are disposed within said treatment chamber perpendicularly to a longitudinal axis of said treatment chamber, and further comprising first and second baffles disposed within said treatment chamber proximate said metal tube, said first and second baffles positioned on opposite sides of said metal tube at approximately forty-five degree angles relative to said metal tube whereby said first and second baffles direct the stream of gaseous emissions toward said metal tube.

25. A system for reducing pollutants in internal combustion engine emissions according to claim 17, further comprising a section of porous chemical substrate disposed within said treatment chamber for promoting the chemical reaction.

26. A system for reducing pollutants in internal combustion engine emissions according to claim 25, wherein said chemical substrate section is disposed downstream from said metal tube so that the stream of gaseous emissions passing proximate said metal tube subsequently passes through said chemical substrate.

27. A system for reducing pollutants in internal combustion engine emissions according to claim 25, further comprising a plate covering a substantial portion of said exhaust opening to restrict passage of the stream of gaseous emissions therethrough.

28. A system for reducing pollutants in internal combustion engine emissions according to claim 25, wherein said pollutants comprise carbon monoxide, and said chemical substrate section comprises an oxidizing agent for oxidizing carbon monoxide as it passes through said substrate.

29. A system for reducing pollutants in internal combustion engine emissions according to claim 25, wherein said chemical substrate section comprises one or more of the group consisting of silica, sodium oxide, alumina, magnesia, calcium oxide, and iron oxide.

30. A method for reducing pollutants in the gaseous emissions of a marine electric generator engine comprising the steps of:
(a) providing a treatment chamber having an intake opening and an exhaust opening at opposing lateral ends of said chamber, a metal tube disposed within said treatment chamber containing an electrode disposed in spaced apart relation to said metal tube and having an opposite high electric potential so that, upon applying a voltage to said electrode, an arc is generated across the space between said electrode and said metal tube, and a porous chemical substrate disposed within said treatment chamber downstream from said metal tube;
(b) connecting said intake opening to said exhaust system of said marine electric generator engine so that a stream of gaseous emissions passes from said exhaust system through said intake opening into said treatment chamber;
(c) supplying a supplemental stream of air to said treatment chamber for diluting said stream of gaseous emissions within said treatment chamber; and
(d) supplying a voltage pulsed at a predetermined frequency to said electrode to generate an arc from said electrode to said metal tube at said predetermined frequency to promote a chemical reaction with the stream of gaseous emissions as the stream passes proximate said metal tube said chemical reaction reducing the concentration of pollutants in the stream.

31. A method for reducing pollutants in the gaseous emissions of a marine electric generator engine comprising the steps of:
(a) providing a device comprising:
(i) a treatment chamber having an intake opening and an exhaust opening at opposing lateral ends of said treatment chamber, said intake opening mateable to an exhaust system of said marine electric generator,
(ii) a metal tube disposed within said treatment chamber containing an electrode disposed in spaced apart relation to said metal tube and having an opposite high electric potential so that, upon applying a voltage to said electrode, an arc is generated across the space between said electrode and said metal tube,
(iii) a porous chemical substrate disposed within said treatment chamber downstream from said metal tube, and
(iv) a manifold having first and second openings at opposing lateral ends of said manifold, said manifold further including an inlet port for receiving a flow of water and an outlet port for exiting the flow of water, at least a portion of said treatment chamber being contained within said manifold, said treatment chamber positioned such that said intake opening is linearly aligned with said first opening and said exhaust opening is linearly aligned with said second opening, said treatment chamber and said manifold defining a space therebetween wherein the flow of water cools said treatment chamber;
(b) connecting said intake opening to said exhaust system of said marine electric generator engine so that a stream of gaseous emissions passes from said exhaust system through said intake opening into said treatment chamber;
(c) supplying a supplemental stream of air to said treatment chamber for diluting the stream of gaseous emissions within said treatment chamber;
(d) supplying a voltage pulsed at a predetermined frequency to said electrode to generate an arc from said electrode to said metal tube at said predetermined frequency to promote a chemical reaction with the stream of gaseous emissions as the stream passes proximate said metal tube, said chemical reaction reducing the concentration of pollutants in the stream; and
(e) connecting a water source to said inlet port and supplying the flow of water into said manifold through said inlet port for cooling said treatment chamber.

32. A method for reducing pollutants in the gaseous emissions of a marine electric generator engine according to claim 30 or 31, wherein said chemical substrate promotes a chemical reaction with the gaseous emission stream further reducing the concentration of pollutants therein as the gaseous emission stream passes through said substrate.

* * * * *